United States Patent
Wu et al.

(10) Patent No.: US 9,361,728 B2
(45) Date of Patent: Jun. 7, 2016

(54) SUBMARINE TOPOGRAPHY CONSTRUCTION METHOD BASED ON MULTI-SOURCE WATER DEPTH DATA INTEGRATION

(71) Applicant: THE SECOND INSTITUTE OF OCEANOGRAPHY, SOA, Hangzhou, Zhejiang Province (CN)

(72) Inventors: Ziyin Wu, Hangzhou (CN); Shoujun Li, Hangzhou (CN); Jihong Shang, Hangzhou (CN); Jiabiao Li, Hangzhou (CN); Xiaowen Luo, Hangzhou (CN); Xiaobing Jin, Hangzhou (CN); Dineng Zhao, Hangzhou (CN); Jieqiong Zhou, Hangzhou (CN)

(73) Assignee: THE SECOND INSTITUTE OF OCEANOGRAPHY, SOA, Hangzhou, Zhejiang Province (CN)

(*) Notice: Subject to any disclaimer, the term of this patent is extended or adjusted under 35 U.S.C. 154(b) by 0 days.

(21) Appl. No.: 14/416,053
(22) PCT Filed: Feb. 17, 2014
(86) PCT No.: PCT/CN2014/072136
§ 371 (c)(1),
(2) Date: Jan. 20, 2015
(87) PCT Pub. No.: WO2015/003496
PCT Pub. Date: Jan. 15, 2015

(65) Prior Publication Data
US 2015/0243074 A1    Aug. 27, 2015

(30) Foreign Application Priority Data
Jul. 8, 2013  (CN) .......................... 2013 1 0282885

(51) Int. Cl.
*G06T 17/05* (2011.01)
*G01S 15/89* (2006.01)
(Continued)

(52) U.S. Cl.
CPC ............... *G06T 17/05* (2013.01); *G01S 15/025* (2013.01); *G01S 15/89* (2013.01); *G06T 5/008* (2013.01); *G06T 7/0032* (2013.01); *G06T 11/60* (2013.01); *G06T 19/00* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 2010/0257004 A1* | 10/2010 | Perlmutter | G06Q 10/0633 705/7.27 |
| 2014/0052687 A1* | 2/2014 | Davidoff | G06N 7/005 706/52 |

FOREIGN PATENT DOCUMENTS

| | | |
|---|---|---|
| CN | 101788666 A | 7/2010 |
| CN | 102446367 A | 5/2012 |

(Continued)

*Primary Examiner* — Andrew G Yang
(74) *Attorney, Agent, or Firm* — Jiwen Chen

(57) ABSTRACT

The invention discloses a submarine topography construction method based on multi-source water depth data integration, which achieves reasonable splicing of various data such as multi-beam sounding, single-beam sounding, historical topography map and global topography and submarine topography construction. The invention comprises the following steps of: converting a historical submarine topography map into grid data, converting water depths of other sources into grids, using an overlapping and contrasting method to evaluate the accuracy of the water depths of different sources; using a multi-map-layer method to carry out integration, cutting and splicing on multi-source water depth data, constructing an error distribution model to reasonably revise and integrate various-source water depth data; and constructing multi-source water depth submarine topography and grid. The submarine topography construction method has the advantages that in marine mapping and charting process, the multi-source data can be effectively used, the historical water depth data accuracy and the comprehensive utilization efficiency are promoted, and the submarine topography construction method has important practical application values in marine mapping, submarine topography charting and submarine scientific studies.

1 Claim, 2 Drawing Sheets

(51) Int. Cl.
  *G01S 15/02* (2006.01)
  *G06T 5/00* (2006.01)
  *G06T 7/00* (2006.01)
  *G06T 11/60* (2006.01)
  *G06T 19/20* (2011.01)
  *G06T 19/00* (2011.01)

(56) References Cited

FOREIGN PATENT DOCUMENTS

| | | |
|---|---|---|
| CN | 102855609 A | 1/2013 |
| CN | 103148842 A | 6/2013 |
| JP | 2004170632 A | 6/2004 |
| KR | 20110018218 A | 2/2011 |

* cited by examiner s# SUBMARINE TOPOGRAPHY CONSTRUCTION METHOD BASED ON MULTI-SOURCE WATER DEPTH DATA INTEGRATION This is a U.S. national stage application of PCT Application No. PCT/CN2014/072136 under 35 U.S.C. 371, filed Feb. 17, 2014 in Chinese, claiming the priority benefit of Chinese Application No. 201310282885.4, filed Jul. 8, 2013, which is hereby incorporated by reference.

TECHNICAL FIELD

The present invention relates to the technical fields of marine mapping, computer graphics, submarine sciences and the like.

BACKGROUND ART

A mapping data blank region frequently exists while mapping due to the regional and phased attributes of multi-beam sounding. For the beauty of the prepared maps, it needs to supplement submarine topography data from other sources, such as historical topography map (including paper medium and electronic topography map), global topography library data, satellite altimetry data and single-beam sounding, and the like. However, the accuracy of the data is far cry from that of the multi-beam sounding. How to have an opportunity to integrate multi-source data is a more difficult problem in preparing the submarine topography map.

The multi-beam sounding represents the most advanced contemporary marine mapping technology and is the preferred data for charting submarine topography maps. The single-beam sounding data has higher accuracy; however, due to the limit of the investigation cost, the mapping lines are generally rarer, which are difficult to prepare a high accuracy technology map, and particularly difficult to prepare a three-dimensional submarine topography map having a sense of reality. The advantage of vectorized data of published large-scale map or nautical chart is that the accuracy of the data in a nearshore shoal water region is higher; however, a larger accuracy problem mostly exists in an abyssal region. A common practice to use paper map data is direct vectorization, thus obtaining linear data of a target sea region, and then splicing the data with that of the multi-beam sounding region through a manual splicing manner. However, it is very difficult to splice a map when mapping counter spacing differs largely from paper map counter spacing. Secondly, it is more difficult to construct a counter tree to achieve topology coloring or charting a three-dimensional submarine topography map. The accuracy of the water depth data measured through satellite altimetry and global topography library is poorer. Particularly, there are large differences between the data in the sea region shallower than 200 m water depth while being contrasted with that of the data measured through multi-beam sounding, and even a situation of frequently intersections between the counters and islands occurs. Usually, this kind of data is not used in a nearshore region and is only used as a kind of supplementary data for charting a submarine topography map in a pelagic deep water region.

Upon the analysis on the basis of retrieved public data, there is no mature technical method for solving the effective splicing problem of multi-source data in charting a submarine topography map; and particularly, no art is available for the seamless splicing and integration of multi-source data from multi-beam sounding, satellite altimetry, single-beam sounding, historical topography map, and the like.

SUMMARY OF THE INVENTION

The present invention aims at the problem of multi-source data integration existed in submarine topography maps, and proposes a method of reserving fine features of an original map through vectorizing the submarine topography map and adding topographical feature lines, realizing organic integration of water depth data from different sources through overlapping, contrasting, correcting and splicing of multi-source water depth data grids, and finally achieving the fidelity reconstruction of the submarine topography.

The present invention is achieved by the technical solution as follows.

A submarine topography construction method based on multi-source water depth data integration, comprising the steps as follows:

step 1: converting a historical submarine topography map into grid data (1) vectorizing an original submarine topography map: scanning a paper pattern submarine topography map through a flatbed scanner, performing electronic vectorization on a plane topography map, and reserving depth attribute of each counter, wherein the vectorized electronic topography map needs to be perfectly matched with the plane topography map, the vectorized electronic topography map forms an electronic topography data set $D_1=\{t1_i\}$, and each counter is composed of a water depth set $\{x1_j, y1_j, z1_j\}$, and $t1_i=\{x1_j, y1_j, z1_j\}$, wherein i and j are natural number;

(2) adding feature auxiliary lines: checking the vectorized electronic topography map and adding auxiliary lines for regions having saddle topography and positive and negative value topography, wherein the auxiliary lines added are consistent with the trend of a vector line in the electronic topography map, and a data set $D_2=\{t2_i\}$ is formed after the auxiliary lines are added, wherein each counter $t2_i$ is composed of a water depth set $\{x2_j, y2_j, z2_j\}$, and $t2_i=\{x2_j, y2_j, z2_j\}$;

(3) converting the topography map into a grid: employing a Kriging gridding method to perform data conversion, wherein grid data $G_{his}(I,J)$ is formed after the conversion;

(4) re-charting a submarine topography map:

for the grid after the conversion, re-charting a submarine topography map according to the same charting parameters as that of the plane topography map in step (1) to form a re-charted topography data set $D_3=\{t3_i\}$, wherein each counter $t3_i$ is composed of a water depth set $\{x3_j, y3_j, z3_j\}$ and $t3_i=\{x3_j, y3_j, z3_j\}$, and wherein the charting parameters refer to projective mode, coordinate system and counter spacing;

alternatively, the method of overlapping, contrasting and evaluating conversion accuracy:

contrasting the data sets formed in step (1) and step (4) through a map layer overlapping and contrasting method;

(a) calculating the spatial distance between the old and new counters $(t1_i=\{x1_j, y1_j, z1_j\}$ and $t3_i=\{x3_j, y3_j, z3_j\})$: $d_j=\sqrt{(x1_j-x3_j)^2+(y1_j-y3_j)^2}$ point by point, (b) calculating the mean error value of the distance between the old and new counters:

$$\bar{d} = \sum_{j=1}^{n} d_j,$$

(c) when $\bar{d}>d$, getting back to step (2) to re-add auxiliary lines, wherein d refers to a pre-determined error value of the distance between the old and new counters, when $\bar{d} \leq d$, outputting a converted grid document $G_{his}(I,J)$, or, employing a method of extracting data of the same point and evaluating the conversion accuracy: in the grid data $G_{his}(I,J)$, extracting water depth value $z4_j$ in sequence based on the coordinates $(x1_j, y1_j)$ of each counter $t1_i=\{x1_j, y1_j, z1_j\}$ in the topography data set and in accordance with an inverse distance weighting method to form a new data set $D_4=\{t4_i\}$, wherein each new water depth data $t4_i$ is composed of a water depth point set, and $t4_i=\{x4_j, y4_j, z4_j\}$;

(a) a method of extracting water depth data: reading $t1_i=\{x1_j, y1_j, z1_j\}$ in sequence, querying the position in the grid document $G_{his}(I,J)$ according to the coordinates $(x1_j, y1_j)$, and calculating the water depth value $z4_j$ of each point among four proximal points according to the inverse distance weighting method:

$$z4_j = \frac{\sum_{I=k}^{k+1}\sum_{J=l}^{l+1} w_{(I,J)} \times dep_{(I,J)}}{\sum_{I=k}^{k+1}\sum_{J=l}^{l+1} w_{(I,J)}}$$

$$w_{(I,J)} = \frac{1}{\sqrt{(x1_i - x_{(I,J)})^2 + (y1_i - y_{(I,J)})^2}}$$

where, $x_{(I,J)}$ and $y_{(I,J)}$ are a coordinate value of the grid data; $w_{(I,J)}$ is a weighted value; and $dep_{(I,J)}$ is a water depth value in the grid document $G_{his}(I,J)$;

(b) calculating the mean error value of the water depth between the old and new counters:

$$\bar{z} = \frac{\sum_{j=1}^{n}|z4_j - z1_j|}{n};$$

(c) when $\bar{z}>z$, getting back to step (2) to re-add auxiliary lines, wherein d refers to a pre-determined error value of the water depth between the old and new counters, when $\bar{z} \leq z$, outputting the converted grid document $G_{his}(I,J)$, step 2: converting water depths of other sources into grids (1) reusing a multi-beam method to determine the submarine water depth data, and gridding the measured submarine water depth data through the inverse distance weighting method to form grid data $G_{his}(I,J)$;

(2) reusing a single-beam method to determine the submarine water depth data, and gridding the measured submarine water depth data through a Kriging gridding method to form grid data $G_{sb}(I,J)$;

(3) reusing a satellite altimetry and global topography library method to measure the submarine water depth data, and gridding the measured submarine water depth data through Gaussian spline interpolation or inverse distance weighting method to form grid data $G_{oth}(I,J)$;

gridding the submarine water depth data measured through the different methods above by the same parameters, including interpolation method, interpolation parameters, coordinates, projection and water depth data measurement datum plane;

step 3: evaluating the accuracy of the submarine water depth data measured through the different methods, wherein the following steps are employed to evaluate:

(1) using a map layer overlapping and contrasting method to carry out overlapping and contrasting on the submarine water depth data measured through the different methods, and determining the accuracy thereof through the water depth difference of different grids in the water depth point of the overlapped region;

(2) contrasting the original submarine water depth data if any, sorting according to the high-low sequence of the water depth accuracy, and reserving the water depth data having the highest accuracy;

in case of no original submarine water depth data, taking precedence of the submarine water depth data measured through multi-beam or single-beam method, followed by the submarine water depth data reflected by the historical topography map and finally the submarine water depth data measured through satellite altimetry and global topography library method;

step 4: integration, cutting and splicing on multi-source water depth data, wherein the following steps may be employed:

(1) taking the water depth data having the highest accuracy determined in step 3 in the overlapped region through a map layer overlapping and contracting method, and correcting the data of the non-overlapped region through the mean error value $\Delta d$ of the water depth data of the overlapped region;

or, employing a gridding method to correct the error water depth data, i.e. constructing a water depth error grid $G_{err}(I,J)$ through a spline or Bezier curve according to the water depth difference data set $D_{err}=\{t_i\}$ of the data having the highest accuracy determined in step 3 and other-source data in the same position of the overlapped region, and then using the error grid to correct the data of the non-overlapped region point by point;

(2) reserving the data having the highest accuracy in the overlapped region and cutting other data to respectively form data grids $\bar{G}_{his}(I,J)$, $\bar{G}_{mb}(I,J)$, $\bar{G}_{sb}(I,J)$ and $\bar{G}_{oth}(I,J)$ after cutting;

step 5: constructing multi-source water depth submarine topography and the grid, wherein the submarine topography is constructed through the following steps:

(1) converting the data grids $\bar{G}_{his}(I,J)$, $\bar{G}_{mb}(I,J)$, $\bar{G}_{sb}(I,J)$ and $\bar{G}_{oth}(I,J)$ formed in step 4(2) into discrete water depth data $D_{his}=\{t_i\}$, $D_{mb}=\{t_i\}$, $D_{sh}=\{t_i\}$ and $D_{oth}=\{t_i\}$;

(2) re-constructing the submarine topography grids for the discrete water depth data in step 5(1) by employing a uniform gridding method to form a uniform data grid $G_{fus}(I,J)$;

or, reading various water depth data grids formed in step 4(2) and integrating the grids to form a uniform data grid $G_{fus}(I,J)$;

(3) re-charting a submarine topography map based on the integrated grid $G_{fus}(I,J)$, overlapping and contrasting the submarine topography map with the topography map in step 1, and evaluating the integrated data accuracy according to the method of method of overlapping, contrasting and evaluating conversion accuracy or the method of data extracting and evaluating conversion accuracy in step 1(4).

In Step 1 of the present invention: converting a historical submarine topography map into grid data, (1) Vectorizing an original submarine topography map. If the original submarine topography map is a paper topography map, a high accuracy scanner needs to be used to convert the paper topography map into an electronic topography map. Then evaluating the accuracy of the scanned topography map according to relevant parameters (frame range, coordinate system and projective mode) of the original map, wherein re-scanning is required in case of deformation. Performing electronic vectorization on the topography map the accuracy of which meets the requirement, and reserving the depth attribute of each counter, wherein the vectorized electronic topography map needs to be perfectly matched with the original map, and the vectorized electronic topography map forms an electronic topography data set $D_1=\{t_i\}$.

(2) Add feature auxiliary lines. Thoroughly check the vectorized submarine topography map, and add auxiliary lines for regions having rarer counters, saddle topography and positive and negative value topography to depict the original map so as to avoid topography distortion from occurring in later gridding, wherein the auxiliary lines added need to have water depth attribute and variable water depth values, and this change needs to be matched with the changing trend of an existing counter or water depth value. The objective of adding the auxiliary lines is to reserve the detailed features of the original map and avoid topography distortion simultaneously. Particularly, addition of the auxiliary lines or water depth values is required when no water depth information in a region encircled by the counter can express the changing trend. A data set $D_2=\{t_i\}$ is formed after the addition.

(3) Converting the topography map into a grid. Generally, the submarine topography map has rarer counters and fewer water depth points (such as a nautical chart) for better reading. Common gridding methods cannot satisfy the conversion requirements, and a Kriging gridding method may be employed for data conversion. The calculating formula is as follows.

$$dep^*_{(x_0)} = \sum_{i=1}^{n} \overline{\omega}_i dep(x_i) = W^T D(x)$$

Where, $dep^*_{(x_0)}$ is a depth point to be interpolated; $dep(x_i)$ is a known depth point which is obtained by making the data set $D_2=\{t_i\}$ discrete to water depth point; and $\overline{w}_i$ is the weight coefficient of each known depth point, wherein the coefficient can be calculated through a Kriging formula:

$$\begin{cases} \sum_{j=1}^{n} w_j y(x_i, x_j) - u = y(x_0, x_i) \\ \sum_{j=1}^{n} w_j = 1 \end{cases} \quad i = 1, 2, \ldots, n$$

Where, $y(x_i,x_j)$ is the covariance between the known depth points; and $y(x_0,x_i)$ is the covariance between the depth point to be interpolated and the known depth points.

Grid data $G_{his}(i,j)$ is formed after the conversion.

(4) Re-charting a submarine topography map. For the converted grids, re-constructing a submarine topography map according to the same parameters as that of the original submarine topography map, wherein the counter spacing of the new and old topography maps need to keep completely consistent.

A topography data set $D_3=\{t_i\}$ after the re-charting is formed.

(5) Overlapping, contrasting and evaluating conversion accuracy. Evaluating the differences of the counters in the new and old submarine topography maps through a map layer overlapping and contrasting method, wherein for the region the counters in which are displaced, deformed or knotted, returning to step (2) to re-add the topography auxiliary lines. Circling in this manner till the new and old submarine topography maps are perfectly matched. Then outputting a converted grid document.

Two methods can be employed to contrast the electronic topographies before and after conversion:

Preliminarily judging whether the old and new electronic topography data $D_1$ and $D_3$ are matched through map layer overlapping and based on a human-computer interaction mode, including whether the old and new counters are consistent in forms and whether the new counters are knotted and distorted. Directly go back to step (2) if a larger deviation exists between the two.

Extracting the water depth values in sequence according to the topography data $D_1=\{t_i\}$ in the grid data $G_{his}(i,j)$, thus forming a new data set $D_4=\{t_i\}$. Then using a statistical method to judge the difference of the counters at each level in sequence and giving a water depth difference threshold value d. When the root-mean-square of the difference of all the water depth points in $D_1=\{t_i\}$ and $D_4=\{t_i\}$ is smaller than d, the two are matched; otherwise, going back to step (2).

Step 2: converting water depths of other sources into grids. For the water depth data from different sources, the gridding methods thereof are different. The following steps may be employed:

(1) For fully-covered multi-beam water depth data, an inverse distance weighting method may be employed for quick gridding to form grid data $G_{mb}(i,j)$ since the data density is high and the data volume is large. The calculating formula is as follows.

$$dep(x, y) = \sum_{i=1}^{i=n} w_i z_i \div \sum_{i=1}^{i=n} w_i, \text{ where, } w_i = \frac{1}{dis_i^2}$$

$z_i$, $w_i$ and $dis_i$ are respectively the water depth value and calculated weighted value of the water depth points participating in the gridding as well as distance between the water depth points and the point of intersection.

(2) For the single-beam sounding data, a Kriging gridding method may be employed for gridding to form grid data $G_{sb}(i,j)$ since the data density is usually rarer.

(3) For the water depth data from satellite altimetry and global topography library, a Gaussian spline interpolation or inverse distance weighting method may be employed for gridding to form grid data $G_{oth}(i,j)$. See step 2(1) for the calculating formula.

(4) Gridding all the data from different sources according to the same parameters, including interpolation method, interpolation parameters, coordinates, projection and water depth data measurement datum plane, and the like.

Step 3: evaluating accuracy of water depths from different sources. The following steps may be employed for evaluation:

(1) Using a map layer overlapping and contrasting method to carry out overlapping and contrasting on the water depth data from different sources, and evaluating the accuracy thereof through the water depth difference of different grids in the water depth point of the overlapped region.

(2) For the water depths knowing the data accuracy of the original source, sorting the water depths according to the water depth accuracy differences, and reserving the water depth data having the highest accuracy.

(3) For the water depth data without knowing the original accuracy, sorting the data according to the reliability of the data sources by taking precedence of the actually measured data (for example, the accuracy of the multi-beam and single-beam sounding data is highest) generally, followed by the data reflected by the historical topography map (for example, a nautical chart and a submarine topography map that is officially published) and finally the data measured through satellite altimetry or global topography library.

Step 4: integration, cutting and splicing on multi-source water depth data, wherein the following steps may be employed:

(1) Using the water depth data having the highest accuracy in the overlapped region through a map layer overlapping and contracting method to evaluate data from other sources, and correct the data of the non-overlapped region through the mean error value Δd of the water depth data of the overlapped region.

A gridding method may also be employed to accurately correct the error water depth data. Generally, constructing a complete water depth error grid $G_{err}(i,j)$ through a spline or Bezier curve according to the water depth difference data set $G_{err}(i,j)$ of the data having the highest accuracy and data from other sources in the same position of the overlapped region, and then using the error grid to correct the data of the non-overlapped region point by point.

(2) Cutting the data having low accuracy in the overlapped region and reserving the data having the highest accuracy to ensure that all data sub-grids are not overlapped but can be mutually spliced to respectively form data grids $\overline{G}_{his}(i,j)$, $\overline{G}_{mb}(i,j)$, $\overline{G}_{sb}(i,j)$ and $\overline{G}_{oth}(i,j)$ after cutting.

Step 5: constructing multi-source water depth submarine topography and grid, wherein the submarine topography may be constructed through the following steps:

(1) Converting the data grids $\overline{G}_{his}(i,j)$, $\overline{G}_{mb}(i,j)$, $\overline{G}_{sb}(i,j)$ and $\overline{G}_{oth}(i,j)$ formed in step 4(2) into discrete water depth data $D_{his}=\{t_i\}$, $D_{mb}=\{t_i\}$, $D_{sb}=\{t_i\}$ and $D_{oth}=\{t_i\}$. Then entering step (2) or (3).

(2) Re-constructing the submarine topography grids for the discrete water depth data in step (1) by employing a uniform gridding method to form a uniform data grid $G_{fus}(i,j)$.

(3) or, skipping step (2) and directly reading various water depth data grids formed in step 4(2) and combining the grids by directly using a uniform method and software to form a uniform data grid $G_{fus}(i,j)$.

(4) Re-charting a submarine topography map based on the integrated grid $G_{fus}(i,j)$, and overlap and contrast the re-charted submarine topography map with the original map. Going back to step 4 to re-correct the water depth data having low accuracy in case that the topography map has distortion, till the accuracy is satisfied.

Beneficial Effects

The present invention realizes conversion, evaluation, correction, integration and splicing of multi-source water depth data and gives detailed technical flow and method, and can effectively utilize the multi-source data during a marine mapping process, thus achieving the construction and electronic mapping of the submarine topography, overcoming the difficult utilization of the traditional historical water depth data, improving the quality of the historical data and the comprehensive utilization rate of multi-source data, and having very important practical application values in marine mapping, computer graphics and submarine scientific studies.

DETAILED DESCRIPTIONS OF THE PREFERRED EMBODIMENTS

The present invention is further descried hereunder by reference to embodiments.

Embodiment 1

Figure 1:
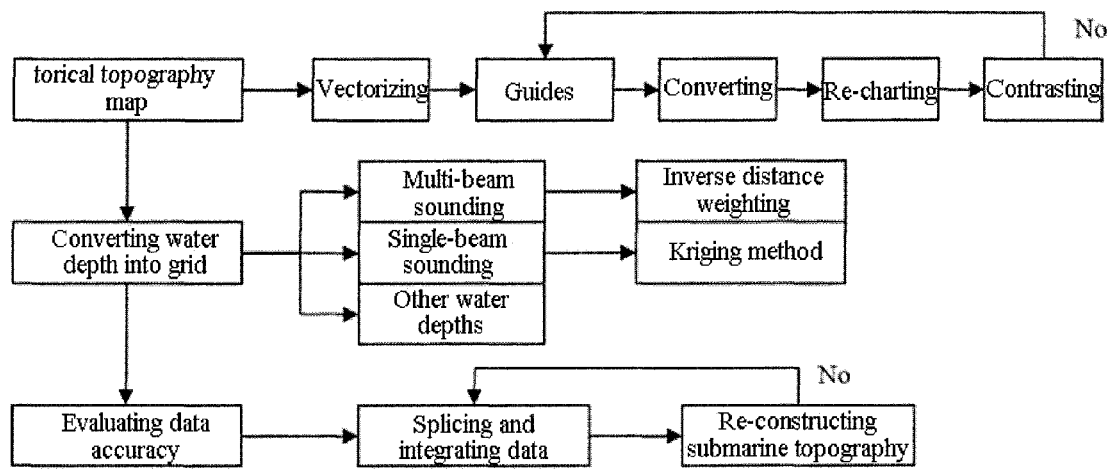
FIG. 1 is a working flowchart of the present invention.

A submarine topography construction method based on multi-source water depth data integration is established according to the steps as follows:

A complete working flowchart is as shown in FIG. 1.

(1) Vectorizing an original submarine topography map. If the original submarine topography map is a paper topography map, a high accuracy scanner needs to be used to convert the paper topography map into an electronic topography map. Then evaluating the accuracy of the scanned topography map according to relevant parameters (frame range, coordinate system and projective mode) of the original map, wherein re-scanning is required in case of deformation. Performing electronic vectorization on the topography map the accuracy of which meets the requirement, and reserving the depth attribute of each counter, wherein the vectorized electronic topography map needs to be perfectly matched with the original map, and the vectorized electronic topography map forms an electronic topography data set $D_1=\{t_i\}$.

(2) Adding feature auxiliary lines. Thoroughly checking the vectorized submarine topography map, and adding auxiliary lines for regions having rarer counters, saddle topography and positive and negative value topography to depict the original map so as to avoid topography distortion from occurring in later gridding, wherein the auxiliary lines added need to have water depth attribute and variable water depth values, and this change needs to be matched with the changing trend of an existing counter or water depth value. The objective of adding the auxiliary lines is to reserve the detailed features of the original map and avoid topography distortion simultaneously. Particularly, addition of the auxiliary lines or water depth values is required when no water depth information in a region encircled by the counter can express the changing trend. A data set $D_2=\{t_i\}$ is formed after the addition.

(3) Converting the topography map into a grid. Generally, the submarine topography map has rarer counters and fewer water depth points (such as a nautical chart) for beautiful reading. Common gridding methods cannot satisfy the conversion requirements, and a Kriging gridding method may be employed for data conversion. The calculating formula is as follows.

$$dep^*_{(x_0)} = \sum_{i=1}^{n} \overline{\omega}_i dep(x_i) = W^T D(x)$$

Where, $dep^*_{(x_o)}$ is a depth point to be interpolated; $dep(x_i)$ is a known depth point which is obtained by making the data set $D_2=\{t_i\}$ discrete to water depth point; and $\overline{w}_i$ is the weight coefficient of each known depth point, wherein the coefficient can be calculated through a Kriging formula:

$$\begin{cases} \sum_{j=1}^{n} w_j y(x_i, x_j) - u = y(x_0, x_i) \\ \sum_{j=1}^{n} w_j = 1 \end{cases} \quad i = 1, 2, \ldots, n$$

Where, $y(x_i, x_j)$ is the covariance between the known depth points; and $y(x_0, x_i)$ is the covariance between the depth point to be interpolated and the known depth points.

Grid data $G_{his}(i,j)$ is formed after the conversion.

(4) Re-charting a submarine topography map. For the converted grids, re-constructing a submarine topography map according to the same parameters as that of the original submarine topography map, wherein the counter spacing of the new and old topography maps need to keep completely consistent.

A topography data set $D_3=\{t_i\}$ after the re-charting is formed.

(5) Overlapping, contrasting and evaluating conversion accuracy. Evaluating the differences of the counters in the new and old submarine topography maps through a map layer overlapping and contrasting method, wherein for the region the counters in which are displaced, deformed or knotted, returning to step (2) to re-add the topography auxiliary lines. Circling in this manner till the new and old submarine topography maps are perfectly matched. Then outputting a converted grid document.

Two methods can be employed to contrast the electronic topographies before and after conversion:

Preliminarily judging whether the old and new electronic topography data $D_1$ and $D_3$ are matched through map layer overlapping and based on a human-computer interaction mode, including whether the old and new counters are consistent in forms and whether the new counters are knotted and distorted. Directly going back to step (2) if a larger deviation exists between the two.

Extracting the water depth values in sequence according to the topography data $D_1=\{t_i\}$ in the grid data $G_{his}(i,j)$ thus forming a new data set $D_4=\{t_i\}$. Then using a statistical method to judge the difference of the counters at each level in sequence and giving a water depth difference threshold value d. When the root-mean-square of the difference of all the water depth points in $D_1\{t_i\}$ and $D_4=\{t_i\}$ is smaller than d, the two are matched; otherwise, going back to step (2).

Figure 2:
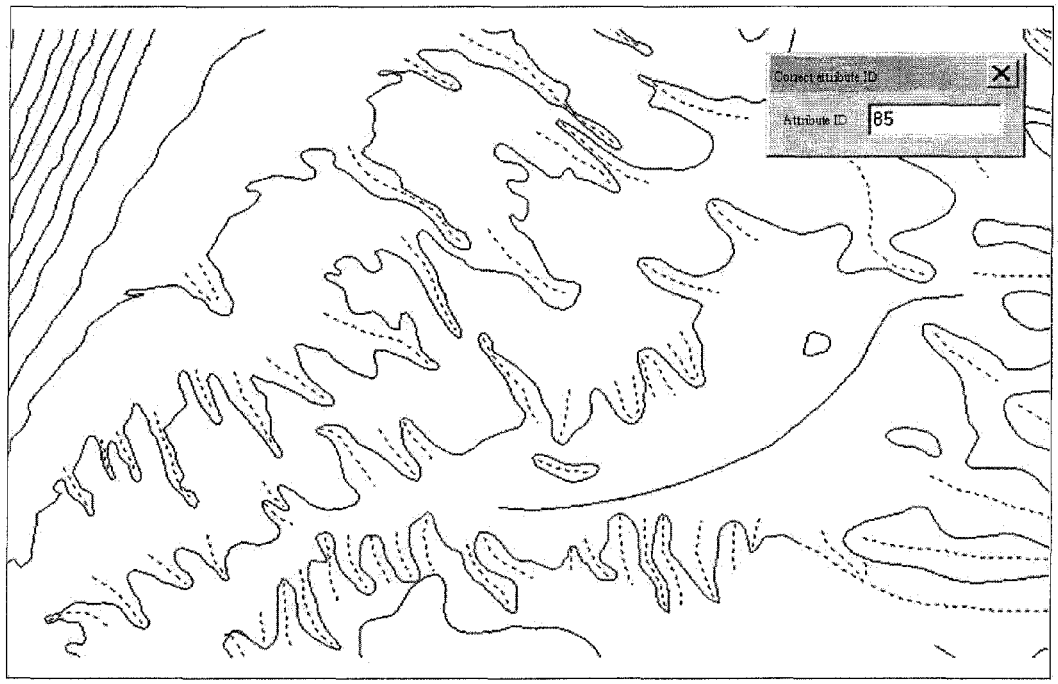
FIG. 2 shows a conversion of historical topography in embodiment of the present invention.

See FIG. 2 for the conversion of the historical topography map.

Step 2: converting water depths of other sources into grids. For the water depth data from different sources, the gridding methods thereof are different. The following steps may be employed:

(1) For fully-covered multi-beam water depth data, an inverse distance weighting method may be employed for quick gridding to form grid data $G_{mb}(i,j)$ since the data density is high and the data volume is large. The calculating formula is as follows.

$$dep(x, y) = \sum_{i=1}^{i=n} w_i z_i \div \sum_{i=1}^{i=n} w_i, \text{ where, } w_i = \frac{1}{dis_i^2}$$

$z_i$, $w_i$ and $dis_i$ are respectively the water depth value and calculated weighted value of the water depth points participating in the gridding as well as distance between the water depth points and the point of intersection.

(2) For the single-beam sounding data, a Kriging gridding method may be employed for gridding to form grid data $G_{sb}(i,j)$ since the data density is usually rarer.

(3) For the water depth data from satellite altimetry and global topography library, a Gaussian spline interpolation or inverse distance weighting method may be employed for gridding to form grid data $G_{oth}(i,j)$. See step 2(1) for the calculating formula.

(4) Gridding all the data from different sources according to the same parameters, including interpolation method, interpolation parameters, coordinates, projection and water depth data measurement datum plane, and the like.

Step 3: evaluating accuracy of water depths from different sources. The following steps may be employed for evaluation:

(1) Using a map layer overlapping and contrasting method to carry out overlapping and contrasting on the water depth data from different sources, and evaluating the accuracy thereof through the water depth difference of different grids in the water depth point of the overlapped region.

(2) For the water depths knowing the data accuracy of the original source, sorting the water depths according to the water depth accuracy differences, and reserving the water depth data having the highest accuracy.

(3) For the water depth data without knowing the original accuracy, sorting the data according to the reliability of the data sources by taking precedence of the actually measured data (for example, the accuracy of the multi-beam and single-beam sounding data is highest) generally, followed by the data reflected by the historical topography map (for example, a nautical chart and a submarine topography map that is officially published) and finally the data measured through satellite altimetry or global topography library.

Step 4: integration, cutting and splicing on multi-source water depth data, wherein the following steps may be employed:

(1) Using the water depth data having the highest accuracy in the overlapped region through a map layer overlapping and contracting method to evaluate data from other sources, and correcting the data of the non-overlapped region through the mean error value $\Delta d$ of the water depth data of the overlapped region.

A gridding method may also be employed to accurately correct the error water depth data. Generally, constructing a complete water depth error grid $G_{err}(i,j)$ through a spline or Bezier curve according to the water depth difference data set $G_{err}(i,j)$ of the data having the highest accuracy and data from other sources in the same position of the overlapped region, and then using the error grid to correct the data of the non-overlapped region point by point.

(2) Cutting the data having low accuracy in the overlapped region and reserving the data having the highest accuracy to ensure that all data sub-grids are not overlapped but can be mutually spliced to respectively form data grids $\overline{G}_{his}(i,j)$, $\overline{G}_{mb}(i,j)$, $\overline{G}_{sb}(i,j)$ and $\overline{G}_{oth}(i,j)$ after cutting.

Figure 3:
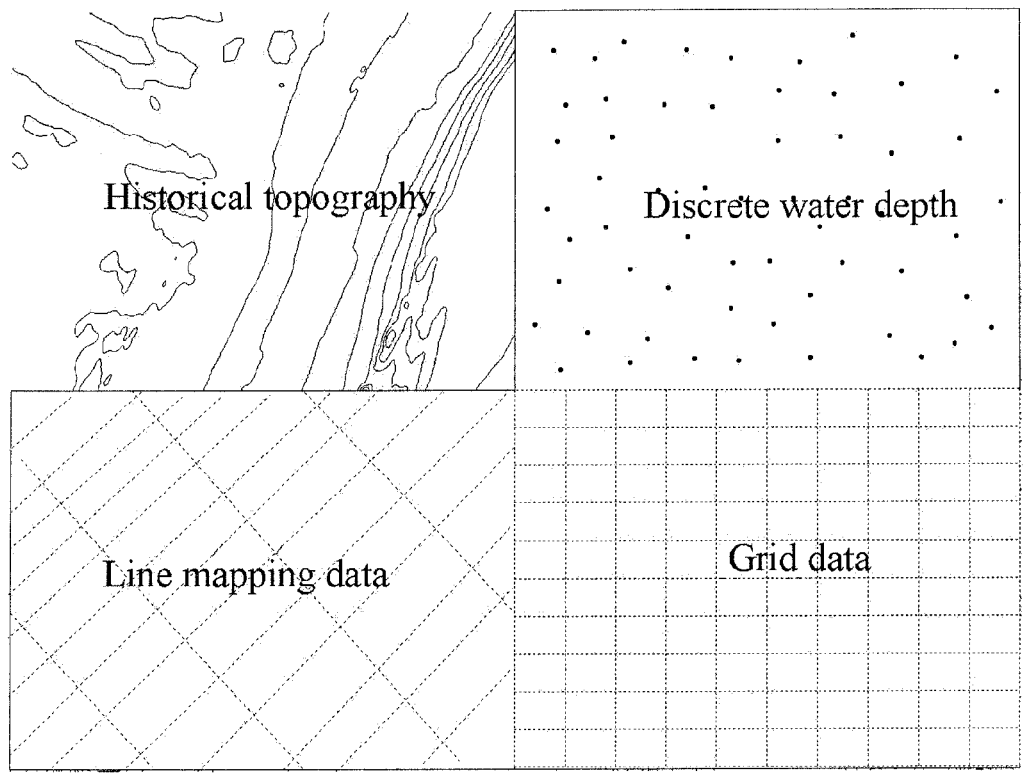
FIG. 3 shows splicing and integration of multi-source data in embodiment of the present invention.

See FIG. 3 for cutting and splicing suggestions for data from different sources.

Step 5: constructing multi-source water depth submarine topography and grid, wherein the submarine topography may be constructed through the following steps:

(1) Converting the data grids $\overline{G}_{his}(i,j)$, $\overline{G}_{mb}(i,j)$, $\overline{G}_{sb}(i,j)$ and $\overline{G}_{oth}(i,j)$ formed in step 4(2) into discrete water depth data $D_{his}=\{t_i\}$, $D_{mb}=\{t_i\}$, $D_{sb}=\{t_i\}$ and $D_{oth}=\{t_i\}$. Then enter step (2) or (3).

(2) Re-constructing the submarine topography grids for the discrete water depth data in step (1) by employing a uniform gridding method to form a uniform data grid $G_{fus}(i,j)$.

or, skipping step (2) and directly reading various water depth data grids formed in step 4(2) and combining the grids by directly using a uniform method and software to form a uniform data grid $G_{fus}(i,j)$.

(3) Re-charting a submarine topography map based on the integrated grid $G_{fus}(i,j)$, and overlapping and contrasting the re-charted submarine topography map with the original map. Going back to step 4 to re-correct the water depth data having low accuracy in case that the topography map has distortion, till the accuracy is satisfied.

Figure 4:
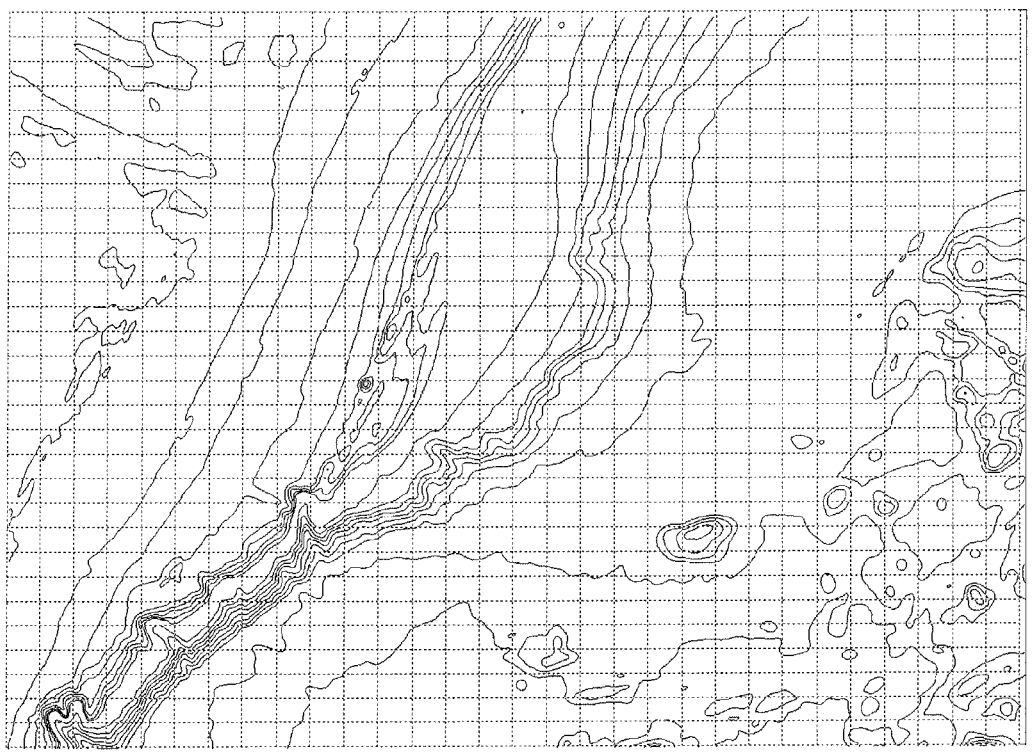
FIG. 4 shows a construction of submarine topography map in embodiment of the present invention.

See FIG. 4 for constructing the submarine topography map on the base of the multi-source water depth data.

The invention claimed is:

1. A computer implemented submarine topography construction method executed on a processor based on multi-source water depth data integration, characterized by comprising the steps as follows and in the following order:

step 1: converting a historical submarine topography map into grid data;

(1) vectorizing an original submarine topography map: scanning a paper pattern submarine topography map through a flatbed scanner, performing electronic vectorization on a plane topography map, and reserving depth attribute of each counter, wherein the vectorized electronic topography map needs to be perfectly matched with the plane topography map, the vectorized electronic topography map forms an electronic topography data set $D_1=\{t1_i\}$, and each counter is composed of a water depth set $\{x1_j, y1_j, z1_j\}$, and $t1_i=\{x1_j, y1_j, z1_j\}$, wherein i and j are natural number;

(2) adding feature auxiliary lines: checking the vectorized electronic topography map and adding auxiliary lines for regions having saddle topography and positive and negative value topography, wherein the auxiliary lines added are consistent with the trend of a vector line in the electronic topography map, and a data set $D_2=\{t2_i\}$ is formed after the auxiliary lines are added, wherein each counter $t2_i$ is composed of a water depth set $\{x2_j, y2_j, z2_j\}$, and $t2_i=\{x2_j, y2_j, z2_j\}$;

(3) converting the topography map into a grid: employing a Kriging gridding method to perform data conversion, wherein grid data $G_{his}(I,J)$ is formed after the conversion, wherein I, J represent water depth value;

(4) re-charting a submarine topography map:

for the grid after the conversion, re-charting a submarine topography map according to the same charting parameters as that of the plane topography map in step (1) to form a re-charted topography data set $D_3=\{t3_i\}$, wherein each counter $t3_i$ is composed of a water depth set $\{x3_j, y3_j, z3_j\}$, and $t3_i=\{x3_j, y3_j, z3_j\}$, and wherein the charting parameters refer to projective mode, coordinate system and counter spacing;

or, method of overlapping, contrasting and evaluating conversion accuracy: contrasting the data sets formed in step (1) and step (4) through a map layer overlapping and contrasting method;

(a) calculating the spatial distance between the old and new counters ($t1_i=\{x1_j, y1_j, z1_j\}$ and $t3_i=\{x3_j, y3_j, z3_j\}$): $d_j = \sqrt{(x1_j-x3_j)^2+(y1_j-y3_j)^2}$ point by point, (b) calculating the mean error value of the distance between the old and new counters:

$$\bar{d} = \sum_{j=1}^{n} d_j,$$

(c) when $\bar{d}>d$, getting back to step (2) to re-add auxiliary lines, wherein d refers to a pre-determined error value of the distance between the old and new counters, when $\bar{d}\leq d$, outputting a converted grid document $G_{his}(I,J)$, or, employing a method of extracting data of the same point and evaluating the conversion accuracy: in the grid data $G_{his}(I,J)$, extracting water depth value $z4_j$ in sequence based on the coordinates $(x1_j, y1_j)$ of each counter $t1_i=\{x1_j, y1_j, z1_j\}$ in the topography data set and in accordance with an inverse distance weighting method to form a new data set $D_4=\{t4_i\}$, wherein each new water depth data $t4_i$ is composed of a water depth point set, and $t4_i=\{x4_j, y4_j, z4_j\}$;

(a) a method of extracting water depth data: reading $t1_i=\{x1_j, y1_j, z1_j\}$ in sequence, querying the position in the grid document $G_{his}(I,J)$ according to the coordinates $(x1_j, y1_j)$, and calculating the water depth value $z4_j$ of each point among four proximal points according to the inverse distance weighting method:

$$z4_j = \frac{\sum_{I=k}^{k+1}\sum_{J=l}^{l+1} w_{(I,J)} \times dep_{(I,J)}}{\sum_{I=k}^{k+1}\sum_{J=l}^{l+1} w_{(I,J)}}$$

$$w_{(I,J)} = \frac{1}{\sqrt{(x1_i - x_{(I,J)})^2 + (y1_i - y_{(I,J)})^2}}$$

where, $x_{(I,J)}$ and $y_{(I,J)}$ are a coordinate value of the grid data; $w_{(I,J)}$ is a weighted value; and $dep_{(I,J)}$ is a water depth value in the grid document $G_{his}(I,J)$;

(b) calculating the mean error value of the water depth between the old and new counters:

$$\bar{z} = \frac{\sum_{j=1}^{n} |z4_j - z1_j|}{n};$$

(c) when $\bar{z}>z$, getting back to step (2) to re-add auxiliary lines, wherein d refers to a pre-determined error value of the water depth between the old and new counters, when $\bar{z}\leq z$, outputting the converted grid document $G_{his}(I,J)$, step 2: converting water depths of other sources into grids;

(1) measuring the submarine water depth data by using multi-beam sensors, and gridding the measured submarine water depth data through the inverse distance weighting method to form grid data $G_{mb}(I,J)$;

(2) measuring the submarine water depth data by using single-beam sensors, and gridding the measured submarine water depth data through a Kriging gridding method to form grid data $G_{sb}(I,J)$;

(3) measuring the submarine water depth data by using a satellite altimetry and global topography system, and gridding the measured submarine water depth data through Gaussian spline interpolation or inverse distance weighting method to form grid data $G_{oth}(I,J)$;

gridding the submarine water depth data measured through the different methods above by the same parameters, including interpolation method, interpolation parameters, coordinates, projection and water depth data measurement datum plane;

step 3: evaluating the accuracy of the submarine water depth data measured through the different methods, wherein the following steps are employed to evaluate:

(1) using a map layer overlapping and contrasting method to carry out overlapping and contrasting on the submarine water depth data measured through the different methods, and determining the accuracy thereof through the water depth difference of different grids in the water depth point of the overlapped region;

(2) contrasting the original submarine water depth data if any, sorting according to the high-low sequence of the water depth accuracy, and reserving the water depth data having the highest accuracy;

in case of no original submarine water depth data, taking precedence of the submarine water depth data measured through multi-beam or single-beam method, followed by the submarine water depth data reflected by the historical topography map and finally the submarine water depth data measured through satellite altimetry and global topography library method;

step 4: integration, cutting and splicing on multi-source water depth data, wherein the following steps may be employed:

(1) taking the water depth data having the highest accuracy determined in step 3 in the overlapped region through a map layer overlapping and contracting method, and correcting the data of the non-overlapped region through the mean error value $\Delta d$ of the water depth data of the overlapped region;

or, employing a gridding method to correct the error water depth data, i.e. constructing a water depth error grid $G_{err}(I,J)$ through a spline or Bezier curve according to the water depth difference data set $D_{err}=\{t_1\}$ of the data having the highest accuracy determined in step 3 and other-source data in the same position of the overlapped region, and then using the error grid to correct the data of the non-overlapped region point by point;

(2) reserving the data having the highest accuracy in the overlapped region and cutting other data to respectively form data grids $\overline{G}_{his}(I,J)$, $\overline{G}_{mb}(I,J)$, $\overline{G}_{sb}(I,J)$ and $\overline{G}_{oth}(I,J)$ after cutting;

step 5: constructing multi-source water depth submarine topography and the grid, wherein the submarine topography is constructed through the following steps:

(1) converting the data grids $\overline{G}_{his}(I,J)$, $\overline{G}_{mb}(I,J)$, $\overline{G}_{sb}(I,J)$ and $\overline{G}_{oth}(I,J)$ formed in step 4(2) into discrete water depth data $D_{his}=\{t_i\}$, $D_{mb}=\{t_i\}$, $D_{sb}=\{t_i\}$ and $D_{oth}=\{t_i\}$;

(2) re-constructing the submarine topography grids for the discrete water depth data in step 5(1) by employing a uniform gridding method to form a uniform data grid $G_{fus}(I,J)$;

or, reading various water depth data grids formed in step 4(2) and integrating the grids to form a uniform data grid $G_{fus}(I,J)$;

(3) re-charting a submarine topography map based on the integrated grid $G_{fus}(I,J)$, overlapping and contrasting the submarine topography map with the topography map in step 1, and evaluating the integrated data accuracy according to the method of method of overlapping, contrasting and evaluating conversion accuracy or the method of data extracting and evaluating conversion accuracy in step 1(4).

* * * * *